United States Patent [19]

Adams et al.

[11] 3,723,773

[45] Mar. 27, 1973

[54] MULTIPLE RESONATOR ACTIVE FILTER

[75] Inventors: David K. Adams, Portola Valley; Raymond Y. C. Ho, Sunnyvale, both of Calif.

[73] Assignee: Stanford Research Institute, Menlo Park, Calif.

[22] Filed: May 27, 1971

[21] Appl. No.: 147,407

Related U.S. Application Data

[63] Continuation-in-part of Ser. No. 821,317, May 2, 1969, abandoned.

[52] U.S. Cl. ..................307/295, 307/233, 328/167, 333/6, 333/80 T

[51] Int. Cl. ........H03k 1/16, H03h 7/02, H03h 11/00

[58] Field of Search..............307/295, 233, 261, 324; 328/167; 333/6, 80 T

[56] References Cited

UNITED STATES PATENTS

| | | | |
|---|---|---|---|
| 3,267,397 | 8/1966 | Skinner | 333/80 T |
| 3,267,298 | 8/1966 | Rumble | 307/261 X |
| 2,896,168 | 7/1959 | Thomas | 307/295 X |
| 2,704,792 | 3/1955 | Eberhard et al. | 307/295 X |

*Primary Examiner*—Paul L. Gensler
*Attorney*—Flehr, Hohbach, Test, Albritton & Herbert

[57] ABSTRACT

An active inductance of essentially infinite Q for use at microwave frequencies is used as a general circuit element, particularly in single and multiple resonator filters and in channel separators for multiplexing applications. The basic circuit element is configured (constructed) utilizing the emitter electrode of a transistor as the input port, the collector electrode is grounded, and the base electrode circuit is adjusted so inductance and useful negative resistance are translated to the emitter from the base circuit at substantially the center of the desired frequency band of operation. The transistor current is adjusted so that the internal emitter resistance of the transistor essentially cancels the negative translated resistance to yield a synthesized microwave inductance with very high Q.

2 Claims, 7 Drawing Figures

DAVID K. ADAMS &
RAYMOND Y. C. HO
INVENTORS

BY Urban H. Faubion

ATTORNEY

DAVID K. ADAMS & RAYMOND Y. C. HO
INVENTORS

BY Urban H. Faubion

ATTORNEY

DAVID K. ADAMS &
RAYMOND Y. C. HO
INVENTORS

BY Urban H. Faubion

ATTORNEY

MULTIPLE RESONATOR ACTIVE FILTER

CROSS REFERENCES TO RELATED APPLICATIONS

This application is a continuation-in-part of application Ser. No. 821,317, filed May 2, 1969 for "Active Microwave Inductive or Filter Element and Application," assigned to the assignee of the present application and now abandoned.

BACKGROUND OF THE INVENTION

1. Field of the Invention

This invention relates to a simple, compact, low-loss active microwave inductance, and to the use of this inductive element in single and multiple-resonator active filters and in channel separators for frequency multiplexing applications. Selective resonators, filters, and multiplexers are required for many microwave applications.

2. Relation to Prior Art

Requirements for small microwave inductor and filter circuits with high Q are becoming more and more stringent. As the size of the microwave circuit becomes smaller through the use of integrated circuit techniques, the importance increases of miniaturizing filters, matching networks, multiplexers, and other normally passive circuits and components.

Microwave circuits, including filters, are generally distributed circuits involving lengths of transmission line, with limited use of lumped elements such as capacitors. If more lumped elements were used, the resulting microwave circuits would be physically smaller, but generally at a sacrifice in performance. Even transmission line elements can be reduced in size by dielectric loading, and by the use of thin-film stripline construction. However, each of these miniaturization techniques leads to reduced element Q. Low Q filter elements degrade signal-to-noise ratios and provide poor frequency selectivity. In particular, the design of narrow bandwidth filters with low insertion loss provides a severe test of compact filter techniques.

In order to provide narrow bandwidth filters with low insertion loss, distributed elements with a large physical volume are required with known techniques. Passive capacitors with small physical size may have acceptable Q; however, inductors must approach a significant fraction of wave length in dimension in order to have high Q. The difficulties associated with lumped circuit construction or high dielectric constant stripline techniques have led to an examination of the possibilities of simulating inductors and resonators with active elements and compact passive components.

The problems pointed out above are discussed in more detail in a recent article entitled "Filters for Microwaves", by Robert Felsenheld, Jr. in the Par. 1969 issue of Electronics World, pp. 45 through 47, inclusive. In addition, Mr. Felsenheld states that "... the practical microwave region starts at 100 MHz (megahertz) and runs up to frequencies in excess of 18 GHz (gigahertz)." This essentially is the frequency range meant in the present description when referring to microwave frequencies.

The present invention provides an inductance utilizing basically active elements, capacitance, and resistance, and has for a principal advantage the provision of a filter which duplicates the frequency characteristics of a high-Q LC filter without the use of high-Q inductors.

The most promising approaches to synthesizing high-Q microwave resonators appear to be with transistors. Some such approaches are found in a discussion of active filters in the issue of *Electronics World* cited above in an article entitled "Active Filters" by James L. Hogin, pp. 58 through 60, inclusive.

An often-discussed technique for creating an active resonator, and one discussed in the Hogin article supra, is to couple two high-Q capacitors with a transistor circuit known as an impedance inverter or gyrator. Impedance inverters and gyrators are most generally applicable at low frequencies, particularly where the relatively complex transistor circuits can be made sufficiently small and with better performance than lumped inductors, e.g., below 1 MHz. Among the disadvantages of impedance inverters and generators is that they generally consist of active stages that yield simple phase shifts like 0° and 180° at low frequency. At higher frequencies, other phase shifts occur which must be compensated. For example, the gyrator characteristic admittance must have nearly zero imaginary part if the gyrator is to be applicable to the synthesis of high-Q resonators. With conventional techniques it is difficult, if not completely impractical, to meet this requirement under other than laboratory conditions for microwave frequencies where the transit time of active devices is appreciable.

Gyrator realization with transistors requires negative resistance at some point in the circuit, and so it is that any active network that produces a high-Q resonator from low-Q elements must rely upon negative resistance effects. Certainly high-Q resonator synthesis with transistors reduces to one of providing virtual inductance and controllable negative resistance. The ideas behind this invention came from recognizing that the grounded collector transistor can be regarded as an impedance rotator. That is, over a wide frequency range, resistance in the base of a grounded-collector-transistor appears predominately as an inductance at the emitter input, capacitance in the base produces positive input resistance, and inductance in the base appears as negative resistance. An approach taking advantage of the first of these characteristics (virtual inductance) is described in an article by J. Lindmayer and W. North entitled "*The Inductive Effect in Transistors*" in *Solid State Electronics*, Vol. 8, pp. 409–15 (1965). However, Lindmayer and North did not fully recognize the possibilities of the approach and their circuit does, therefore, not provide resonators with the high Q desired at microwave frequencies.

OBJECTS AND SUMMARY OF THE INVENTION

It is therefore an object of the present invention to provide a microwave inductance and resonator circuit utilizing a transistor (or several transistors) which provides a higher Q at higher operating frequencies than other circuits known.

It is another object of the invention to provide such a circuit wherein the inherent characteristics of microwave transistors are utilized.

It is a further object of the invention to utilize the characteristics of the high-Q resonators described above in applications such as microwave filters involving single and multiple frequency resonators and frequency separators for separating a wide band of microwave frequencies into a plurality of narrow bands of frequencies for applications such as frequency multiplexing.

In carrying out the present invention, a high-Q resonator is synthesized utilizing an inverted common collector transistor configuration with resistance and inductance in the base circuit which are selected to provide inductance and maximum negative resistance at the emitter terminal at substantially the center of the desired frequency band of operation so that the emitter current of the transistor can then be adjusted to provide an effective resistance of minimum magnitude between the input terminals of the resonator leaving a very high Q inductance.

BRIEF DESCRIPTION OF THE DRAWINGS

The novel features which are believed to be characteristic of the invention are set forth with particularity in the appended claims. The invention itself, however, both as to its organizAtion and method of operation, together with further objects and advantages thereof, may best be understood by reference to the following description taken in conjunction with the accompanying drawings in which:

DESCRIPTION OF THE PREFERRED EMBODIMENTS

Figure 1:
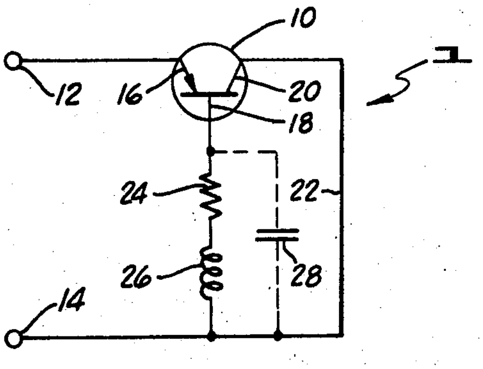
FIG. 1 is a schematic diagram showing the basic high-Q inductance circuit utilized in the present invention.

The primary component of the circuit illustrated in FIG. 1, which constitutes the basic inductance for resonator circuits is a transistor 10 which is connected in a grounded collector configuration which is referred to specifically as the "inverted common collector" configuration. Transistor 10 is provided with an emitter electrode 16, base electrode 18, and collector electrode 20. As illustrated, a lead or conductor 22 is provided which connects the collector electrode 20 directly to the reference or ground potential input terminal 14, hence the name "grounded collector." Emitter electrode 16 is connected directly to input terminal 12 and the base electrode 18 is connected to the ground or reference terminal 14 through a circuit including base resistance 24 and base inductance 26. A base capacity 28 is also shown connected between the transistor base lead 18 and ground. However, it is illustrated as connected broken lines primarily because it is an internal capacitance parasitic of the transistor. The base resistance 24 consists of transistor parasitic resistance plus external resistance if used. The base inductance 26 consists of a transistor lead parasitic plus external inductance is used.

Suitable dc biasing circuits for the transistor 10 are well known in the art. One such suitable biasing circuit is shown in FIG. 1. Terminal 12 is connected through a radio frequency choke 11 to a terminal 13. Terminal 13 is connected through an RF bypass capacitor 15 to ground and through an adjustable resistance 17 to a terminal 19 which is connected to a biasing voltage source, Vs. Terminal 19 is connected through a resistance 21 to a terminal 23. A resistance 25 is connected between terminal 23 and ground. A radio frequency choke 27 is connected between terminal 23 and a terminal 29. An additional RF bypass capacitor 31 is connected between terminal 29 and terminal 14 and a radio frequency choke 33 is connected between terminal 14 and ground.

The adjustable resistance 17 is utilized for controlling the dc emitter current of the transistor 10 and hence the value of the emitter resistance $r_e$ as seen at the emitter terminal.

Figure 2:
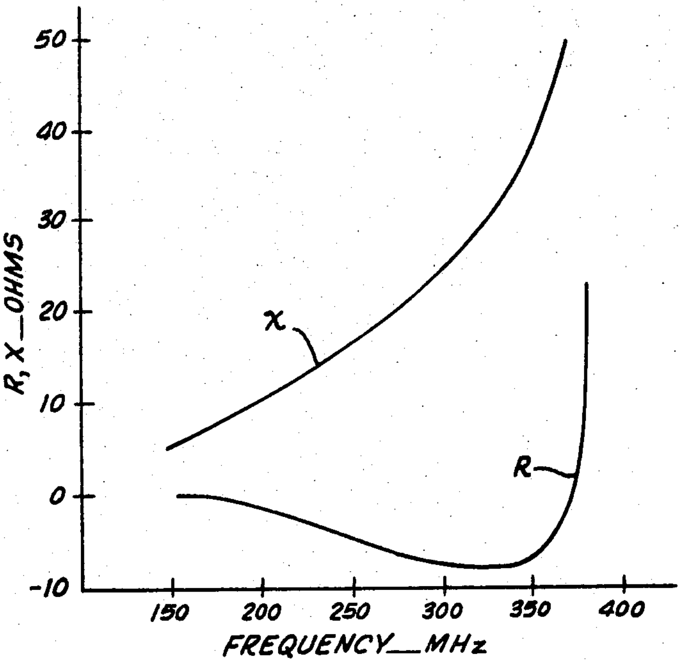
FIG. 2 is a graph showing frequency in MHz (Megahertz) plotted along the axis of abscissae, and resistance and inductive reactance in ohms plotted along the axis of ordinates for a transistor having the configuration of the circuit of FIG. 1.

The plot of FIG. 2 illustrates the components of the input impedance $z = R + JX$ which was taken with circuit components as follows:

transistor 10, a 2N 3866 transistor
resistance 24, 23 ohms
inductance 26, 22.8 nanohenries
capacitance 28, 4.9 picofarads The upper curve of FIG. 2 represents the inductive reactance X and the lower curve, the resistance as seen at the input terminals but excluding the internal emitter resistance given approximately by $r_e$ = 26/I ohms, where I is the DC emitter current in milliamps. The inductive reactance X of the input impedance starts near zero and rises as the frequency is increased from 150 MHz up to over 350 MHz, and the resistance is somewhat parabolic starting to drop off from near zero at approximately 150 MHz to a maximum negative magnitude between 300 and 350 MHz, and rising sharply above about 350 MHz. In the absence of any base capacity 28, a negative resistance maximum will not appear. By designing the base circuit so the negative resistance maximum occurs near the desired frequency of operation, optimum circuit stability results. The frequency of the negative resistance maximum depends mainly on the values of the base inductance 26 and the base capacity 28 in FIG. 1.

The data in FIG. 2 has been plotted after subtracting the current dependent emitter resistance $r_e$ from the measured impedance at the emitter terminal. An observation important to this invention is that $r_e$ can be adjusted to balance the negative resistance reflected at the emitter to yield a net resistance near zero ohms in series with the synthesized inductance. If the negative resistance is near its maximum value, as shown for example in FIG. 2, very stable high-Q microwave inductors can be obtained.

An interpretation of the data presented in FIG. 2 affirms that the inverted common collector circuit of FIG. 1 is basically an impedance rotator which provides or produces an effect whereby resistance (e.g. resistor 24 in the base circuit) in the base circuit of the transistor is translated predominately as a virtual inductance at the emitter (curve labeled X in FIG. 2). Similarly, inductance in the base circuit (e. g., inductance 26) appears predominately as the virtual negative resistance at the emitter, as plotted in the curve labeled R in FIG. 2. Any virtual impedance presented at the emitter is effectively in series with the intrinsic impedance of the emitter. For example, a resistive component of impedance at the emitter ($r_e$) would degrade the Q of any virtual impedance derived from the rotation property of the inverse common collector circuit. In order to avoid degradation of the circuit Q, the inductance 26 in the base circuit is utilized to produce a compensating negative resistance. However, the negative resistance thus produced is very stable since it is derived from the internal carrier diffusion mechanism in the transistor plus the effects of the short base lead wire.

The use of the rotation concept to explain the inductive transistor circuit does not mean that any exact angle of rotation is required. Rotation angles of 45° to 90° are normally used, but the effect can be obtained with even smaller angles of rotation.

In order to optimize the effects of circuit elements and provide a stable circuit, the inductance 26 is selected so that the maximum (maximum in magnitude) negative resistance occurs at essentially the desired resonator frequency or at frequencies near where the inductance will be used. The negative resistance maximum in the circuit illustrated can occur at frequencies in excess of the transistor alpha cutoff frequency by an amount which is somewhat dependent upon the maximum frequency of oscillation of the transistor. Further, to optimize performance, the operating current of the transistor is adjusted so that the resistive component of the emitter impedance just cancels the negative translated (or reflected) resistance. The result is that an inductance of essentially infinite Q appears between input terminals 12 and 14 of transistor 10.

It is not necessary to operate the inductive transistor circuit at the negative resistance maximum, but this operating point will be referred to often in this discussion because it is desirable for reasons of stability.

The use of a small inductance in the transistor base to produce negative resistance in the emitter is an important part of this invention because base lead inductance is a natural parasitic in most transistors. However, a combination of resistance and capacitance can also be used at some reduction in frequency range. One use of R-C elements has been proposed by G. R. Jindal, in *IEEE Proc. Letters*, vol. 55, No. 1, p, 105 (January 1967). However, the Jindal circuit has not been recognized as a useful microwave configuration, it has limited frequency range, and makes no allowance for the parasitic inductance of the base lead. In this invention it is shown that the base lead alone is often sufficient to give high Q virtual inductance.

The following chart shows the improvement obtained utilizing the circuit of FIG. 1, with the components selected as described above relative to using an inverted common collector circuit with only resistance and capacity in the base circuit.

| | Transistor $f_{max}$ and $f_\alpha$ | |
|---|---|---|
| | $f_{max}=f_\alpha$ | $f_{max}=2f_\alpha$ |
| Maximum frequency for which optimum negative resistance can be obtained using the circuit in FIG. 1 | $0.7 f_\alpha$ | $1.5 f_\alpha$ |
| Maximum frequency for which optimum negative resistance can be obtained using an R-C base circuit | $0.36 f_\alpha$ | $0.78 f_\alpha$ |

The first line of the above chart refers to two different transistors with different published frequency characteristics. The data for the first transistor indicates that the manufacturers specified maximum frequency of oscillation ($f_{max}$) is equal to the specified alpha cutoff frequency ($f_\alpha$ ) and for the second transistor (last column on the right) the maximum frequency of oscillation is twice the alpha cutoff frequency. Reading line 2 of the chart which refers to the circuit of FIG. 1 using the properly selected base inductance, the maximum frequency at which optimum stability can be obtained using the first transistor ($f_{max}/f_\alpha = 1$) is 0.7 $x$ the transistor alpha cutoff frequency, and using the second transistor ($f_{max}/f_\alpha = 2$), the maximum frequency is 1.5 $x$ the alpha cutoff frequency. The data for the last line of the chart shows that the circuit using only resistance in the base (minimum negative resistance for the best possible case) and the first transistor, the maximum frequency for maximum Q (not infinite Q) is 0.36 $x$ the transistor alpha cutoff frequency. For the optimum case with only resistance in the base circuit and the second transistor in the circuit, the maximum frequency for highest Q is 0.78 $x$ the alpha cutoff frequency. Thus it is seen that utilization of the base inductance and adjusting the parameters as suggested above provides a possibility of obtaining an infinite Q resonator at almost twice the frequency of the circuit without the small base inductive impedance. In addition, it is demonstrated that an infinite Q resonator can be obtained with a transistor up to and above the alpha cutoff frequency.

In practice, a separate lumped base inductance may not be required to produce the needed negative resistance, since the base lead itself often has sufficient inductance. The lead of the transistor 10 needs to be cut only approximately to length. Obtaining an exact value of negative resistance is not required because adjustment of the emitter current controls or trims the emitter resistance $r_e$ in series. With the inductance in the base circuit, the emitter resistance is adjusted to bring the total resistance in the emitter circuit close to zero, which produces the high Q virtual inductance needed.

Figure 3:
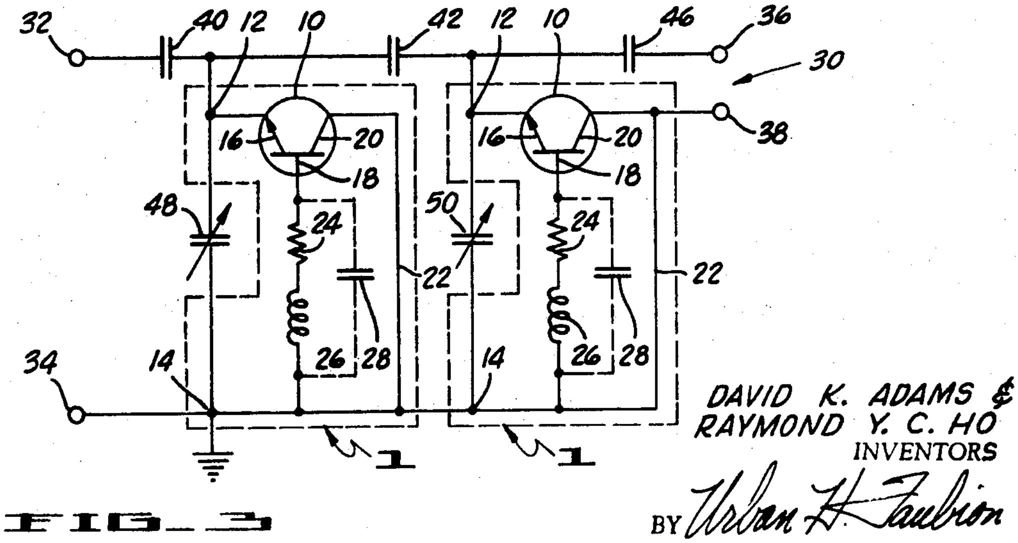
FIG. 3 is a schematic diagram of a multiple resonator filter utilizing the circuit of FIG. 1.

The basic circuit illustrated in FIG. 1 has been used in capacitively coupled bandpass filters as illustrated in FIG. 3. This figure shows an active filter consisting of two active resonators of precisely the same design as that illustrated in FIG. 1 and with the parameters adjusted as described. Only the RF circuits are shown in FIG. 3. That is, the two resonators in the active filter 30 are put in broken-line boxes and labeled I to indicate they are resonators of the type illustrated in FIG. 1. In order to simplify the description and drawings, the components of the resonators are given the same reference numeral as the corresponding components of FIG. 1, and specific resonator circuits are not described. The active filter is provided with two input terminals 32 and 34 and two output terminals 36 and 38. One of the output terminals 38 is connected directly to one of the input terminals 34 (the lower terminals of the figure), and the two are connected directly to a ground or reference potential. The coupling circuit for the two resonators 1 comprises a series circuit between the other input and output terminals (32 and 36) including series connected coupling capacitors 40, 42, and 46. One capacitor 40 is in the series circuit between input terminal 32 and the input terminal 12 of the first resonator, a second one of the coupling capacitors 42 is located in the series circuit between the input terminals 12 of the first and second resonators, and the third coupling capacitor 46 is connected in the series circuit between the output terminal 36 and the next adjacent active resonator. In order to provide further coupling and tuning of the resonator frequencies, the circuits are each provided with coupling and trimming or tuning capacitors 48 and 50, each connected between an input terminal 12 of the resonators 1 and its ground or reference terminal 14.

Figure 4:
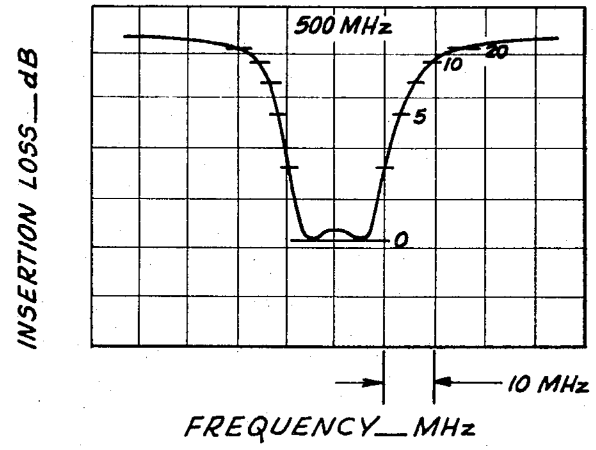
FIG. 4 is a graph showing frequency in MHz plotted along the axis of abscissae and insertion loss in db plotted along the axis of ordinates and reproducing an actual scope trace for a double resonator filter of the configuration illustrated in FIG. 3.

The two-resonator filter characteristic is illustrated in FIG. 4 where frequency is plotted along the axis of abscissae, and insertion loss in db is plotted along the axis of the ordinates. An inspection of the figure shows that over a 10 MHz band centered at 500 MHz the insertion loss of the two-resonator filter is essentially zero, and that the passband shape is that of a classical Tchebyscheff response. The filter bandwidth is approximately 2 percent; however, it may be tuned to yield both wider and narrower bandwidths. Three-resonator filters have been built on the same principles as the two-resonator circuit of FIG. 3, with proportionally higher stopband attenuation.

In order to obtain the characteristics illustrated in FIG. 4, the parameters of the various circuit components are as follows:

Coupling capacitors 40, 42, 46, 0.5 picofarad capacitors

Figure 5:
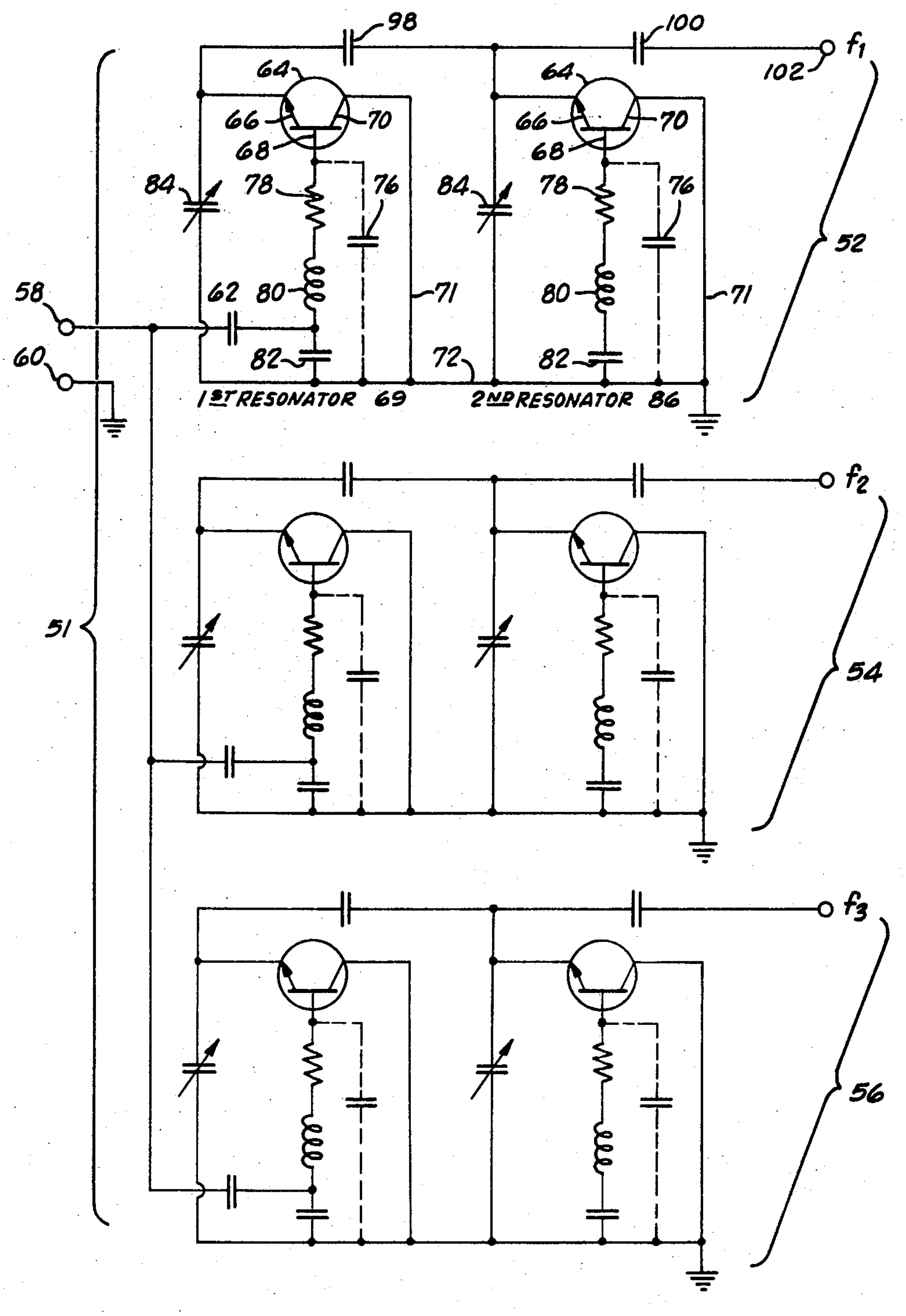
FIG. 5 illustrates schematically a multiplex or frequency separator for dividing a wide band of microwave frequencies into a plurality of narrower bands of frequencies which utilizes the basic active inductor circuit illustrated in FIG. 1.

Tuning capacitors 48 and 50 — variable capacitors with values variable from 0.5 to 20 picofarads Resistors approximately 10 ohms Inductors 26, approximately 10 nanohenries Base capacitors 28, approximately 3 picofarads Transistors 10, 2 N 3866's An extension of the above technique to frequency multiplexing for separating a wide band of microwave frequencies into a number of narrower frequency bands is illustrated in FIG. 5. For this arrangement, only one channel 52 of the frequency separator 51 is fully described and numbered since the other channels 54 and 56 are identical in operation. The frequency separator 51 is provided with input terminals 58 and 60. Since terminal 60 is reference or ground potential only, the single input terminal 58 needs consideration.

Aside from the different means of coupling into the separator channel 52, each individual channel is essentially a multiple resonator filter of the type illustrated in FIG. 3. The input coupling circuit, capacitor 62 and capacitor 82, is connected into the first resonator of channel 52, in a manner that will be described later.

The first resonator of the frequency separator channel 52, like the basic circuit of FIG. 1, utilizes a transistor 64 connected in the "inverted common collector" configuration. That is, the transistor 64 is provided with an emitter electrode 66, base electrode 68, and collector electrode 70; the collector electrode is connected directly to the reference or ground potential lead 72 of the channel by means of lead 71. The emitter electrode 66 is connected directly to the channel coupling lead 74 for coupling to subsequent resonators if needed. Again, a base shunt capacity 76 is shown as connected between the transistor base lead 68 and ground lead 72 by broken lines primarily because it is an effective capacitance due to the grounded collector connection. The transistor base lead 68 is also connected directly to the channel ground lead 72 through a circuit which includes serially connected base resistor 78, base inductor 80, and base coupling capacitor 82.

The base coupling capacitors 62 and 82 constitute the only difference between the basic portion of the circuit illustrated for the frequency separator or multiplexer, and that illustrated in FIGS. 1 and 3 for a simple filter. The base capacitor 82 is utilized here for the purpose of coupling with the input coupling capacitor 62 which is connected directly between input terminal 58 and the point on the transistor base circuit between inductance 80 and capacitor 82. The capacitor 82 is selected to be large enough so only a small change in the base circuit impedance results. The capacitor 62 is small, so it too does not significantly affect the base circuit, but it does couple an input signal into the transistor base. After the input signal passes through the transistor, it emerges into the highly selective emitter circuit. If the signal frequency corresponds to the channel frequency, it passes further to the output. Otherwise it is rejected. A rejected signal does not affect the common input due to the isolation provided by the input transistor and by the C - 62, C - 82 input coupling network. Therefore, the common input can consist of a broad spectrum which can be separated into individual frequency components with negligible interaction between channels.

In order to provide a resonating circuit (that is, to complete the first resonator of the frequency separator), a resonating and trimming shunt capacitor 84 is connected between the transistor emitter and channel round lead 72, thus effectively placing the capacitor 84 in parallel with the transistor emitter and base across the transistor emitter and base circuits. The trimming and resonating capacitor 84 may then be adjusted after the characteristics of the transistor circuit are adjusted in the manner described in connection with FIG. 1. Again, at the high frequencies involved, the base circuit lead 68 of the transistor 64 may provide sufficient resistance and inductance without adding lumped elements.

The second resonator 86 in each frequency channel, and the subsequent resonators which may be found to be desirable in order to provide further frequency selectivity, may incorporate precisely the same circuit elements as utilized for the first resonator 69 and the circuit elements are connected (as illustrated) in the same manner. For this reason subsequent resonator circuits are not described either for the channel 52 or for other channels 54 and 56, and the elements of the second resonator are not described in detail or given new reference numerals. It is believed that this method of indicating the structure simplifies the description while at the same time providing an adequate understanding of the invention.

Figure 6:
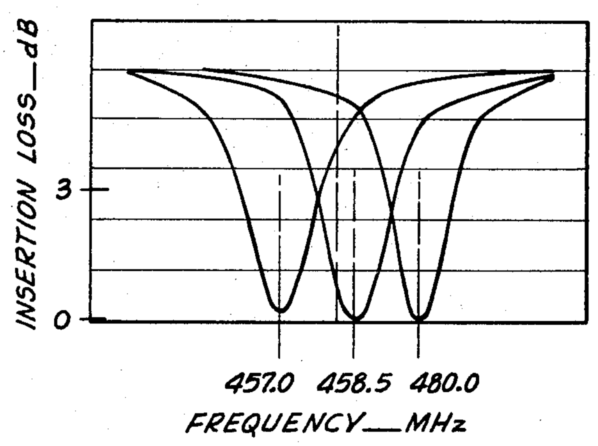
FIG. 6 is a graph showing frequency in MHz plotted along the axis of abscissae and insertion loss in db plotted along the axis of ordinates and reproducing an actual scope trace for a three-channel frequency of the configuration illustrated in FIG. 5.

FIG. 6 illustrates the frequency response of a 3-channel frequency separator of the type illustrated in FIG. 5. Frequency in MHz is plotted along the axis of abscissae and insertion loss in db is plotted along the axis of ordinates. Individual channel bandwidths are about 2 MHz with their frequencies centered at 457 MHz, 458.5 MHz, and 460 MHz, respectively. Each of the channels provides essentially zero insertion loss at the center frequency and less than 3 db insertion loss over a full 2-MHz bandwidth.

Figure 7:
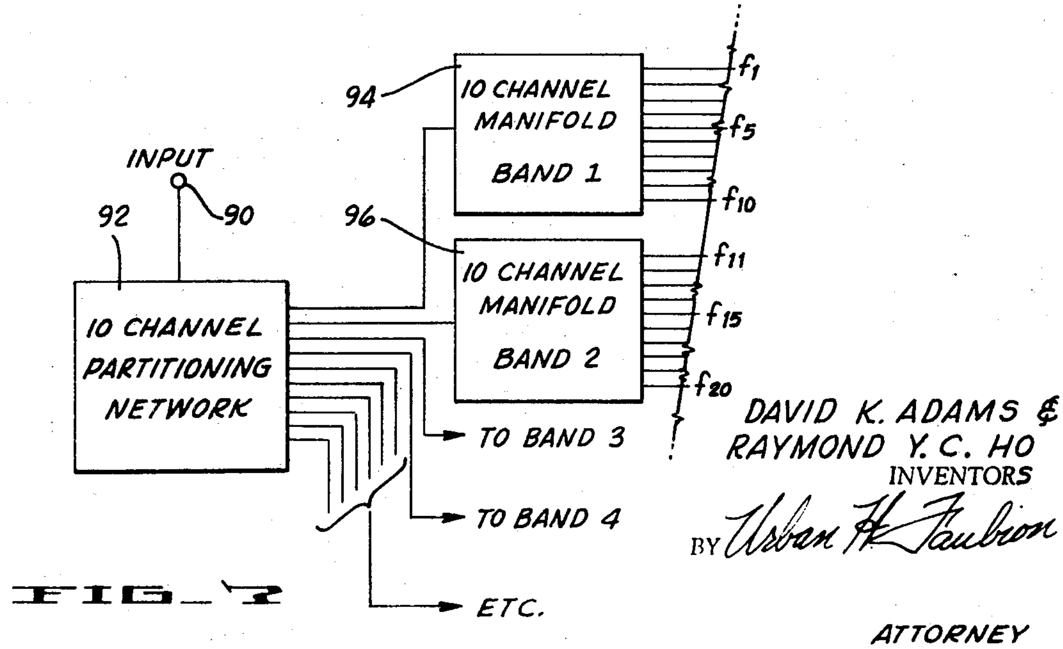
FIG. 7 illustrates a partitioning system in block diagram which utilizes a number of the frequency separator systems of FIG. 5 to separate many more frequency information channels over a much wider frequency band than the system of FIG. 5 alone is designed to accomplish.

FIG. 7 illustrates a block diagram form the method of utilizing the frequency separator channels as illustrated in FIG. 5 to obtain a separation into, for example, 100 channels for frequency multiplexing applications. In the illustration an input terminal 90 which corresponds to input terminal 58 of the separation channels of FIG. 5 is provided and is shown connected to 10-band partitioning network or, in other words, to 10 frequency-separating channels of the kind illustrated in FIG. 5. The output of each of the individual ones of the 10-band partitioning network is brought out by leads and connected to a series of further frequency-separating channels 94 and 96, each of which again contains 10 (more or less) of the frequency-separating networks of narrower frequency bands.

Using this system, the input information may be, for example, in frequency bands centered 2 MHz apart, over a band of frequencies approximately 200 MHz wide. The 10-band partitioning network 92 divides the 200 MHz-wide band into 10 bands each 20 MHz wide. Each 20 MHz band is then applied to another 10-channel frequency separating network, e.g. 94 where the 20-MHz wide band is broken down into individual frequency bands approximately 2 MHz wide and each separated by approximately 2 MHz as illustrated by the curves of FIG. 6 which are derived from the frequency separator circuit of FIG. 5. This partitioning scheme is not realizable with passive reciprocal circuits. It is made possible by the isolation properties of the ICC circuit in FIG. 5.

While particular embodiments of the invention have been shown, it will of course be understood that the invention is not limited to these specific embodiments, since many modifications both in the circuit arrangement and in the instrumentalities employed may be made. It is contemplated that the appended claims will cover any such modifications as fall within the true spirit and scope of this invention.

We claim:

1. A multiple resonator filter for operation at microwave frequencies having a filter input terminal, a filter output terminal, and a filter reference potential terminal, said filter including in combination a plurality of active filter elements and coupling circuit means connecting said active filter elements to each other and to said filter input and output terminals, each of said active filter elements intended for operation at a predetermined frequency greater than 100 MHz and including an input terminal, a reference potential terminal, and a DC biased transistor having emitter, collector and base electrodes and inherent base-collector capacitance, inherent base resistance, and inherent emitter resistance, said emitter electrode connected to said input terminal and said inherent emitter resistance having a predetermined value $r_e$ given approximately by $r_e = 26/I$ ohms where $I$ is the DC emitter current in milliamps, base circuit means connecting said base electrode to said reference potential terminal, collector circuit means connecting said collector electrode to said reference potential terminal whereby said inherent base collector capacitance appears in parallel with said base circuit means, said base circuit means comprising an inductance in series with said inherent base resistance, said inductance having an inductance value such that as translated as a frequency dependent negative resistance at said emitter electrode, the negative resistance is approximately equal to $-r_e$ at said predetermined frequency whereby the total resistance at the emitter electrode is approximately zero at said predetermined frequency, said coupling circuit means including a series connected capacitor between said active filter elements whereby the effective predetermined frequency of operation of each active filter element is offset in frequency.

2. A multiple resonator filter for operation at microwave frequencies having a filter input terminal, a filter output terminal, and a filter reference potential terminal, said filter including in combination a plurality of active filter elements and coupling circuit means connecting said active filter elements to each other and to said filter input and output terminals, each of said active filter elements intended for operation at a predetermined frequency greater than 100 MHz and including an input terminal, a reference potential terminal, and a DC biased transistor having emitter, collector and base electrodes and inherent base-collector capacitance, inherent base resistance, and inherent emitter resistance, said emitter electrode connected to said input terminal and said inherent emitter resistance having a predetermined value $r_e$ given approximately by $r_e = 26/I$ ohms where $I$ is the DC emitter current in milliamps, base circuit means connecting said base electrode to said reference potential terminal, collector circuit means connecting said collector electrode to said reference potential terminal whereby said inherent base collector capacitance appears in parallel with said base circuit means, said base circuit means comprising an inductance in series with said inherent base resistance, said inductance having an inductance value such that as translated as a frequency dependent negative resistance at said emitter electrode, the negative resistance is approximately equal to $-r_e$ at said predetermined frequency whereby the total resistance at the emitter electrode is approximately zero at said predetermined frequency, said coupling circuit means including a plurality of coupling capacitors and a plurality of shunt resonance tuning capacitors, said coupling capacitors connected in series between said filter input and output terminals, said input terminals of each individual filter element each connected between a pair of said coupling capacitors, said shunt tuning capacitors each connected between the said input and reference potential terminals of an individual filter element.

* * * * *